J. BEESON.
Combined Planter and Cultivator.
No. 224,988. Patented Mar. 2, 1880.
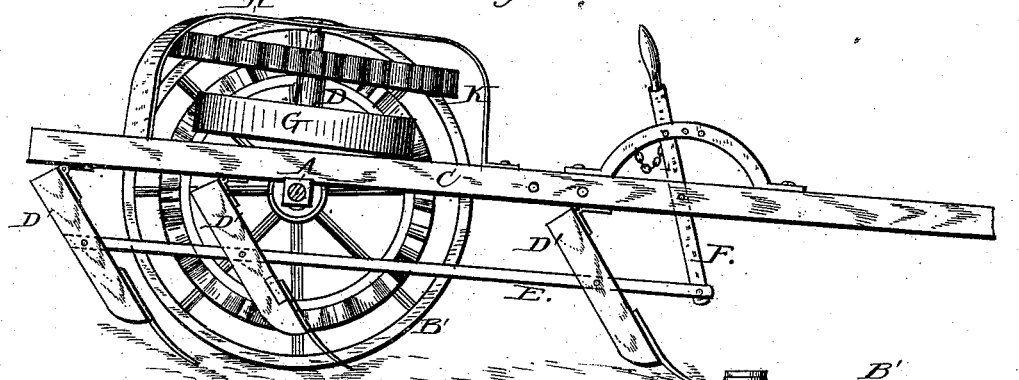
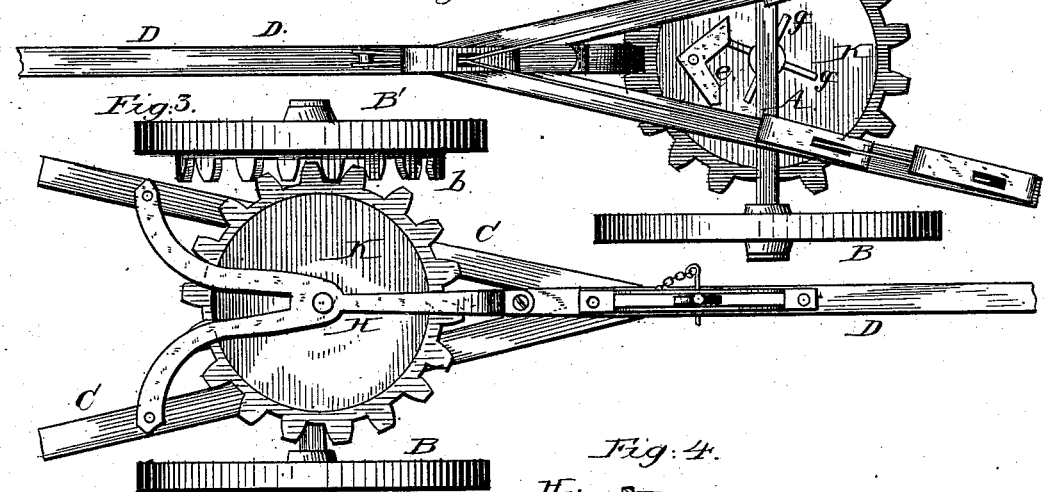
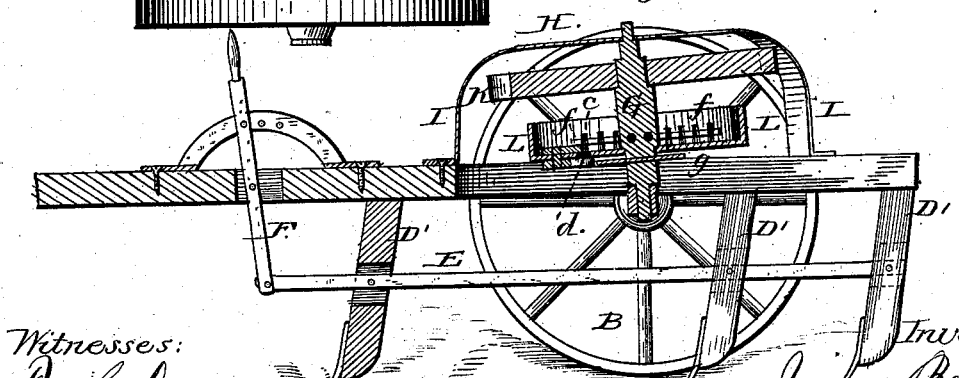

UNITED STATES PATENT OFFICE.

JAMES BEESON, OF OKOLONA, MISSISSIPPI.

COMBINED PLANTER AND CULTIVATOR.

SPECIFICATION forming part of Letters Patent No. 224,988, dated March 2, 1880.

Application filed July 14, 1879.

*To all whom it may concern:*

Be it known that I, JAMES BEESON, of Okolona, in the county of Chickasaw and State of Mississippi, have invented certain new and useful Improvements in a Combined Planter and Cultivator; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation, one of the wheels having been removed to better show the construction and arrangement of parts. Fig. 2 is a bottom view. Fig. 3 is a top view or plan, and Fig. 4 is a longitudinal vertical section.

Similar letters of reference indicate corresponding parts in all the figures.

This invention relates to that class of agricultural implements known as "combined planters and cultivators;" and it consists in the improvements hereinafter described, and particularly pointed out in the claim.

In the drawings, A is the axle, and B B' the wheels, one of which, B', is the driving-wheel, and is provided with a concentric row of bevel-cogs, b. Secured upon axle A is a bifurcated frame, C C, into the forward end of which the tongue D is inserted. Upon the under side of frame C C are hinged the adjustable plow-stocks or cultivator-beams D', one of which is affixed at the point of unison of the frame C C with its tongue D. The hinged beams D' are connected by a bifurcated rod, E, the forward end of which is hinged or pivoted in a lever, F, having its fulcrum in the tongue D, the upper end of which is provided with a handle within easy reach of the driver's seat. The upper end of lever F works, preferably, in a segmental rack-bar, and is provided with a spring-catch, so as to retain it in any given position. By this arrangement the plows may be lifted up from the ground, and their pitch or angle adjusted at will, while the machine is in operation.

Journaled in a box upon the axle, between the side pieces of the frame, is a vertical shaft, G, the upper end of which is journaled in a cross-piece, H, secured upon two uprights, I I.

K is a horizontal bevel-wheel, which meshes with the drive-wheel B', and is keyed or otherwise secured upon shaft G, above the seed-box L, which rests upon frame C C. The seed-box is perforated centrally, to allow shaft G to pass through, and the central perforation surrounded by an annular flange or sleeve, to prevent the seed from falling through the perforation.

In the rear part of the seed-box, back of shaft G, is another smaller perforation, c, covered by a vibrating seed-slide, d, which is connected to and operated by a cam, e, upon the under side of the seed-box. This cam is made with two arms at a right angle to each other, like a bell-crank, the ends of which are beveled, as shown in the bottom plan, Fig. 2.

Projecting laterally from that part of shaft G which passes vertically through the seed-box L (which is, preferably, cylindrical in shape) are arms $f f$, or agitators, for feeding the seed to the opening c, through which it is dropped; and below the bottom of the seed-box are pins g, secured in and rotating with the shaft, and which engage with and operate the cam e, imparting to this, by alternately striking its two arms, a vibrating motion, and thus vibrating the seed-slide d, which covers the opening c in the seed-box.

It is obvious that plows or shovels of any suitable construction may be affixed upon the adjustable stocks or beams D', according to the nature of the soil and character of the seed it is desired to plant; but I prefer to use ordinary cultivator-shovels, in combination with turning-plows, as productive of the most satisfactory results.

The shovels or small plows are secured upon the front face of the beams in the usual manner, and the turning-plows secured to the sides thereof by bolts and braces in any preferred way.

Having thus described my invention, I claim and desire to secure by Letters Patent of the United States—

The combination, with the perforated seed-box L, provided with the seed-opening c, vibrating slide or cut-off d, and operating-cam e, arranged as described, of the vertical rotating shaft G, having agitators f and pins or tappets g, substantially as set forth.

In testimony that I claim the foregoing as my own I have hereto affixed my signature in presence of two witnesses.

JAMES BEESON.

Witnesses:
JAMES BENTON GRAY,
CHAUNCY MOORE SPRAGUE.